(12) United States Patent
Samperi (10) Patent No.: US 12,427,404 B2
(45) Date of Patent: Sep. 30, 2025

(54) GAME CONTROLLER WITH MODULAR EXTERNAL SHELL

(71) Applicant: Panda Hardware LLC, Spring House, PA (US)

(72) Inventor: Matthew Samperi, Lansdale, PA (US)

(73) Assignee: PANDA HARDWARE LLC, Spring House, PA (US)

( * ) Notice: Subject to any disclaimer, the term of this patent is extended or adjusted under 35 U.S.C. 154(b) by 246 days.

(21) Appl. No.: 17/940,180

(22) Filed: Sep. 8, 2022

(65) Prior Publication Data

US 2023/0071216 A1    Mar. 9, 2023

Related U.S. Application Data

(60) Provisional application No. 63/242,098, filed on Sep. 9, 2021.

(51) Int. Cl.
*A63F 13/24* (2014.01)
*A63F 13/98* (2014.01)

(52) U.S. Cl.
CPC .............. *A63F 13/24* (2014.09); *A63F 13/98* (2014.09)

(58) Field of Classification Search
CPC .................. A63F 13/24; A63F 13/98
See application file for complete search history.

(56) References Cited

U.S. PATENT DOCUMENTS

| | | | |
|---|---|---|---|
| 6,241,247 B1 * | 6/2001 | Sternberg | A63F 13/24 |
| | | | 273/148 B |
| D578,167 S * | 10/2008 | Harris | D14/401 |
| 7,582,017 B2 * | 9/2009 | Sternberg | G06F 3/033 |
| | | | 463/36 |
| 7,758,424 B2 | 7/2010 | Riggs et al. | |
| 7,837,559 B2 * | 11/2010 | Kidakarn | A63F 13/24 |
| | | | 463/37 |
| 8,091,892 B2 | 1/2012 | Sternberg | |
| 8,241,126 B2 | 8/2012 | Ambinder et al. | |
| D712,484 S * | 9/2014 | Sumii | D14/401 |
| D712,973 S * | 9/2014 | Sumii | D14/401 |
| 10,507,385 B2 | 12/2019 | Lyden | |
| 10,780,343 B2 * | 9/2020 | Chou | A63F 13/98 |
| 10,814,222 B2 | 10/2020 | Hutchens et al. | |
| 11,154,772 B2 * | 10/2021 | Crain | A63F 13/24 |
| 11,779,835 B1 * | 10/2023 | Wang | A63F 13/24 |
| | | | 463/37 |

(Continued)

FOREIGN PATENT DOCUMENTS

CN        112451964 A      3/2021

OTHER PUBLICATIONS

Amazon.com; Plastic Game Controller Housing Case with Buttons Replacement Set Fit for Sony Playstation 4 JDM-040 JDM-050 JDM-055; Berry~1.

(Continued)

*Primary Examiner* — Carl V Larsen
(74) *Attorney, Agent, or Firm* — McDonald Hopkins LLC; James P. Muraff (57) ABSTRACT

A game controller which comprises shell members that can be easily disconnected such that external shell components or controls of the game controller can be swapped out for shells, controls, etc. having different aesthetics. Preferably, magnets are used which provide that no tools are needed to take the shell apart.

22 Claims, 12 Drawing Sheets

(56) References Cited

U.S. PATENT DOCUMENTS

| | | | | |
|---|---|---|---|---|
| 2005/0075172 | A1* | 4/2005 | Coleman | A63F 13/98 |
| | | | | 463/47 |
| 2007/0045951 | A1* | 3/2007 | Robertson | A63F 13/98 |
| | | | | 273/148 B |
| 2009/0054146 | A1 | 2/2009 | Epstein et al. | |
| 2010/0298053 | A1* | 11/2010 | Kotkin | A63F 13/98 |
| | | | | 463/37 |
| 2011/0306424 | A1* | 12/2011 | Kazama | A63F 13/98 |
| | | | | 463/37 |
| 2014/0323220 | A1* | 10/2014 | Lee | A63F 13/00 |
| | | | | 463/37 |
| 2015/0283458 | A1* | 10/2015 | Burgess | A63F 13/24 |
| | | | | 463/37 |
| 2016/0346682 | A1* | 12/2016 | Burgess | G06F 3/0227 |
| 2017/0106274 | A1* | 4/2017 | Ramcheran | A63F 13/24 |
| 2018/0207523 | A1* | 7/2018 | Lyden | A63F 13/214 |
| 2018/0264355 | A1* | 9/2018 | Burgess | A63F 13/24 |
| 2018/0353850 | A1* | 12/2018 | Strahle | A63F 13/285 |
| 2019/0126143 | A1* | 5/2019 | Schmitz | A63F 13/22 |
| 2020/0030694 | A1* | 1/2020 | Muramatsu | G06F 3/0338 |
| 2020/0179798 | A1* | 6/2020 | Wannenmacher | A63F 13/98 |
| 2023/0133332 | A1* | 5/2023 | Samperi | A63F 13/22 |
| | | | | 463/37 |

OTHER PUBLICATIONS

New Atlas; Grifta gamepad splits in two and changes size; Mar. 25, 2015.

Extended European Search Report issued on Feb. 6, 2023 in connection with a corresponding foreign application.

* cited by examiner

GAME CONTROLLER WITH MODULAR EXTERNAL SHELL

RELATED APPLICATION (PRIORITY CLAIM)

The present application claims the benefit of U.S. Provisional Application Ser. No. 63/242,098, filed Sep. 9, 2021, which is hereby incorporated by reference in its entirety.

BACKGROUND

The present invention generally relates to game controllers, and more specifically relates to a game controller having a modular external shell.

A typical game controller has a given size and shape that cannot be modified. In other words, typically there are no options for changing the ergonomics of existing game controllers. However, users have hands of every shape and size. As such, it is common for a user to have to settle for a game controller that is not ergonomically optimal. To modify the aesthetic of a typical game controller, a user would have to disassemble the entire controller to remove the plastic shell for customization.

To make minimal ergonomic changes to existing game controllers, flexible sleeves have been added to controllers. These flexible sleeves are made from rubberized material that only add some thickness to the controller's existing shape, not allowing for a major change in the size or shape of the structure. Additionally, when playing games for extended periods of time, hands can become sweaty, and the rubberized materials of the flexible sleeves become slippery when wet, causing the user to lose a proper grip of the controller.

A conventional game controller does not allow for complete, easy customization of the ergonomics of the external structure, while maintaining the original functions of the controller. To completely change the ergonomics of a typical, conventional game controller, a user would need to purchase a differently shaped controller, which may have different functionality than the original controller, and attempt to effectively swap parts.

Some current game controllers have various levels of modularity. These are limited to adding or swapping buttons and changing the layout of individual components (such as swapping the location of the directional pad, analog sticks, and other buttons). The method of swapping out components is always visible on the external structure of the controller or does not include removing the entire external structure, allowing for the entire external structure to be replaced as a modular component itself.

SUMMARY

One object of an embodiment of the present invention is to provide a single modular game controller that is configured to allow for users to change the stock external structure of the controller to one that is more ergonomic, comfortable, or aesthetically pleasing for that specific user.

Another object of an embodiment of the present invention is to provide a game controller which is configured to allow the user to easily gain access to the inside of the game controller, thereby allowing the user to easily modify the internal structures of the controller, replace parts, and access additional features of the controller.

Briefly, an embodiment of the present invention provides a game controller which comprises an inner shell and an outer shell, both of which are connected via magnets thereby allowing the user to easily take the controller apart without having to use tools or having to interact with snap fits which could very well break.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION

While this invention may be susceptible to embodiment in different forms, there is shown in the drawings and will be described herein in detail, a specific embodiment with the understanding that the present disclosure is to be considered an exemplification of the principles of the invention and is not intended to limit the invention to that as illustrated.

Figure 1:
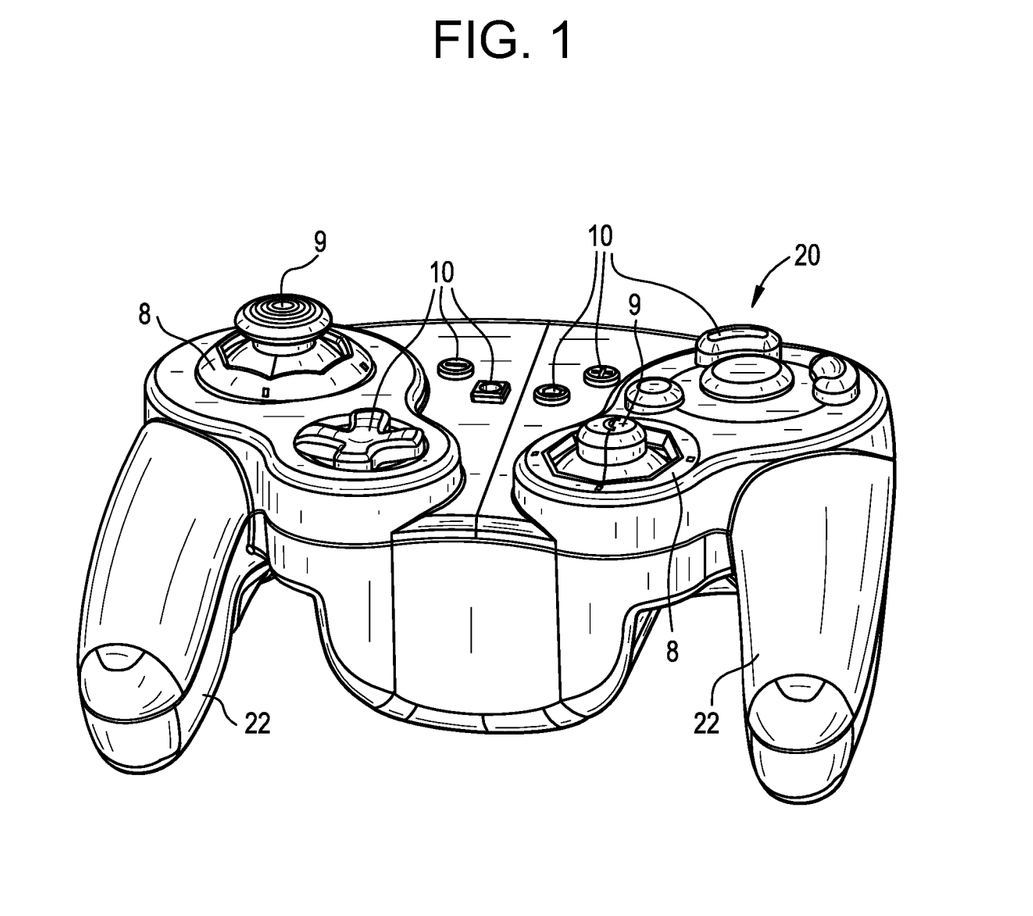
FIG. 1 is a perspective view of a game controller which is in accordance with an embodiment of the present invention.

FIG. 1 is a perspective view of a game controller 20 which is in accordance with an embodiment of the present invention. As shown, the game controller 20 includes sections 22 which a user grips with his or her palms. Additionally, the game controller 20 includes several controls 9, 10 with which the user interacts while gaming (i.e., using his or her fingers or thumb). As shown, these controls 9, 10 may include things like buttons, analog sticks (i.e., joysticks), directional pads, triggers, etc. As shown, removable gates 8 are preferably provided on the game controller 20, proximate each analog stick 9 for effectively dictating where the stick 9 ultimately ends up when being moved in that general direction.

Figure 2:
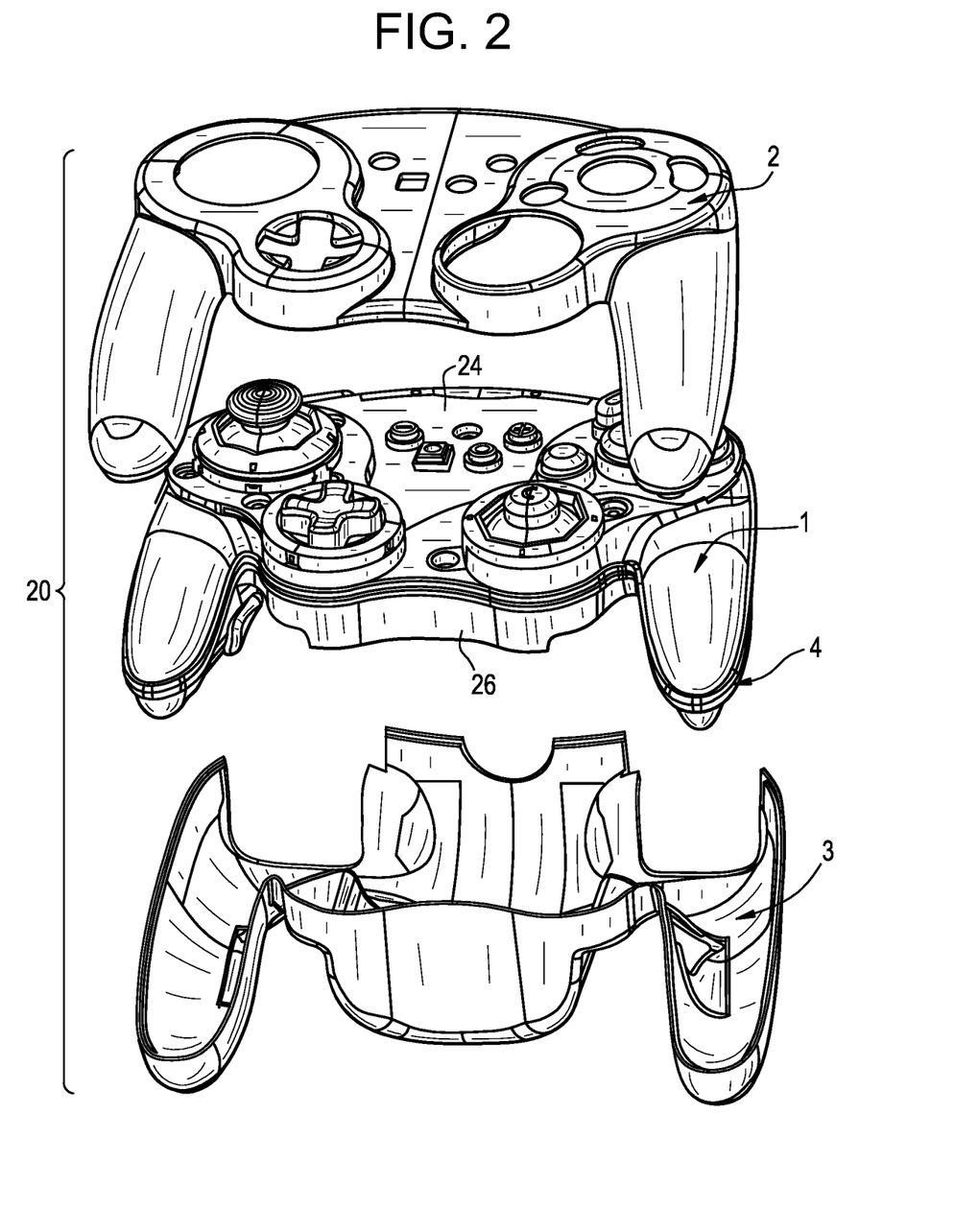
FIG. 2 is an exploded view of the game controller, showing outer shell components exploded away from an inner shell.

FIG. 2 is an exploded view of the game controller 20 that is shown in FIG. 1. As shown in FIG. 2, the game controller 20 preferably comprises an internal core structure 1 that is surrounded by an outer shell that comprises an outer top shell 2 and an outer bottom shell 3. The two outer shell components 2 and 3 come together to effectively surround and protect the internal core structure 1 that is disposed therein (to provide what is shown in FIG. 1). As shown in FIG. 2, preferably the internal core structure 1 comprises a stabilizing lip 4 which goes along the entire perimeter of the internal core structure 1. The lip 4 and its purpose will be described more fully later hereinbelow.

Figure 3:
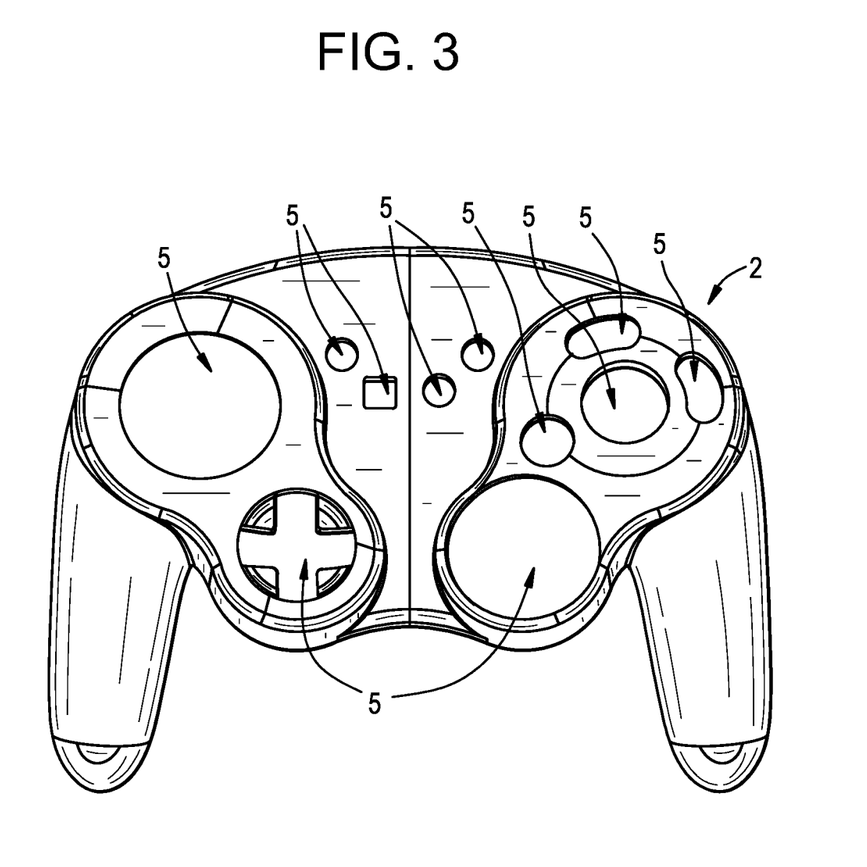
FIG. 3 is a top view of the outer top shell of the game controller.
Figure 4:
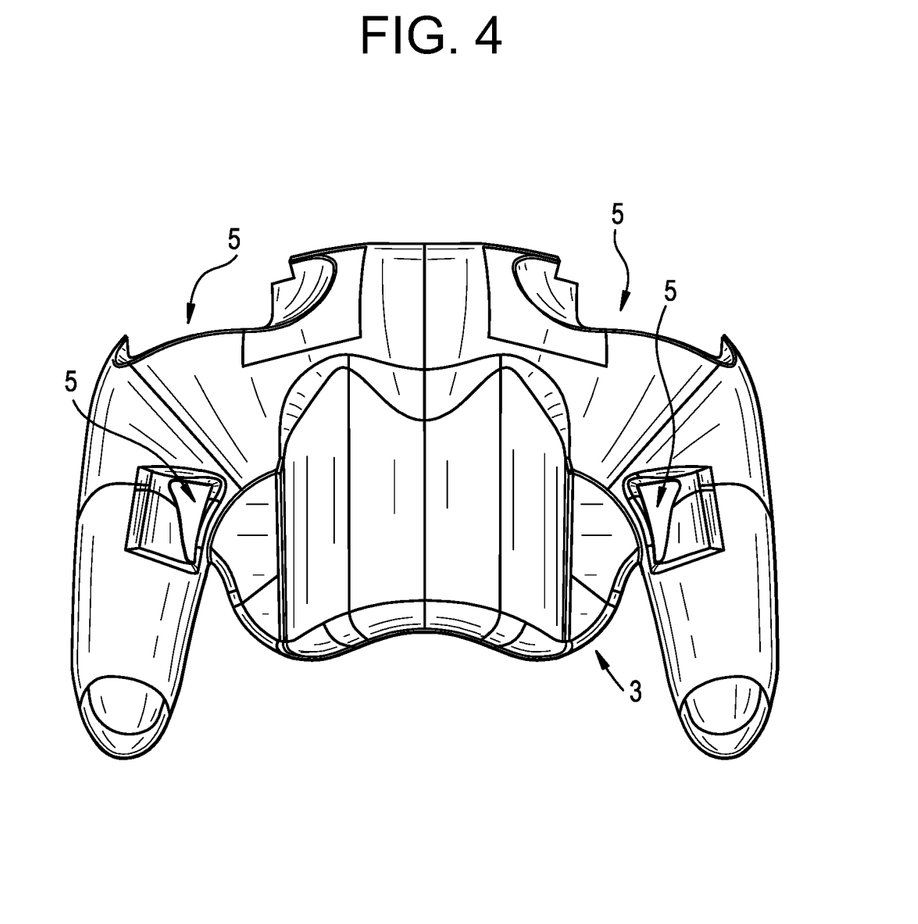
FIG. 4 is a bottom view of the outer bottom shell of the game controller.

FIG. 3 is a top view of the outer top shell 2 of the game controller 20, while FIG. 4 is a bottom view of the outer bottom shell 3. As shown in FIGS. 3 and 4, both outer shells 2 and 3 have user interface feature holes 5 for receiving controls 9, 10 of the game controller 20 such that they extend therethrough (see FIG. 1) and allow the user to have access.

Figure 5:
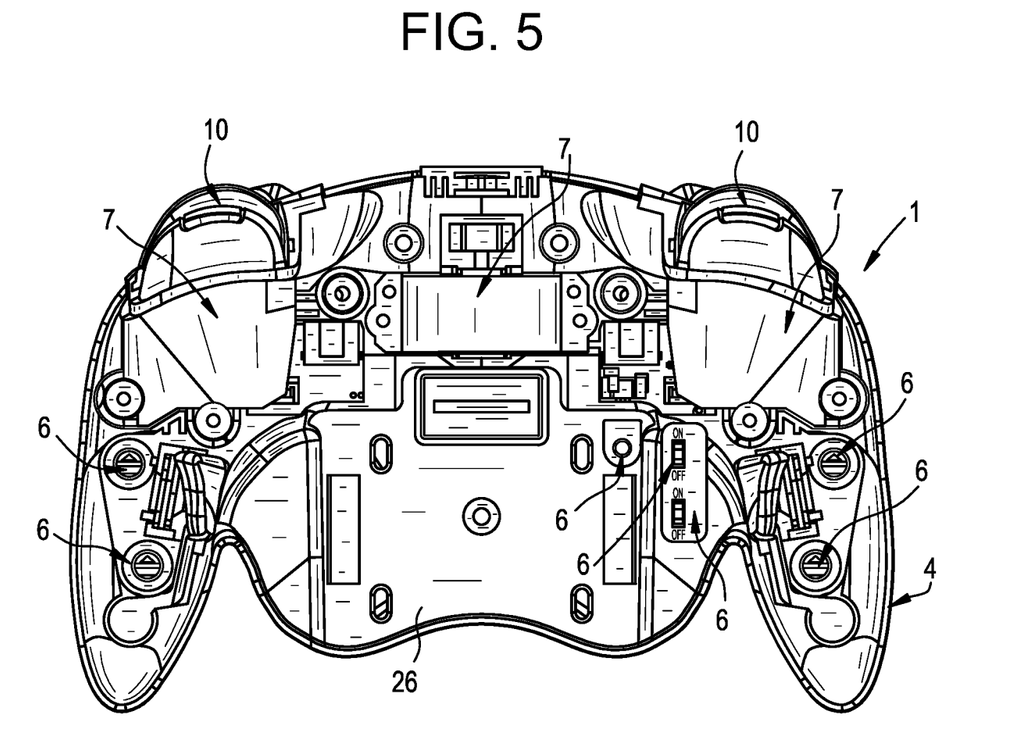
FIG. 5 is a bottom view of the inner shell of the game controller.
Figure 6:
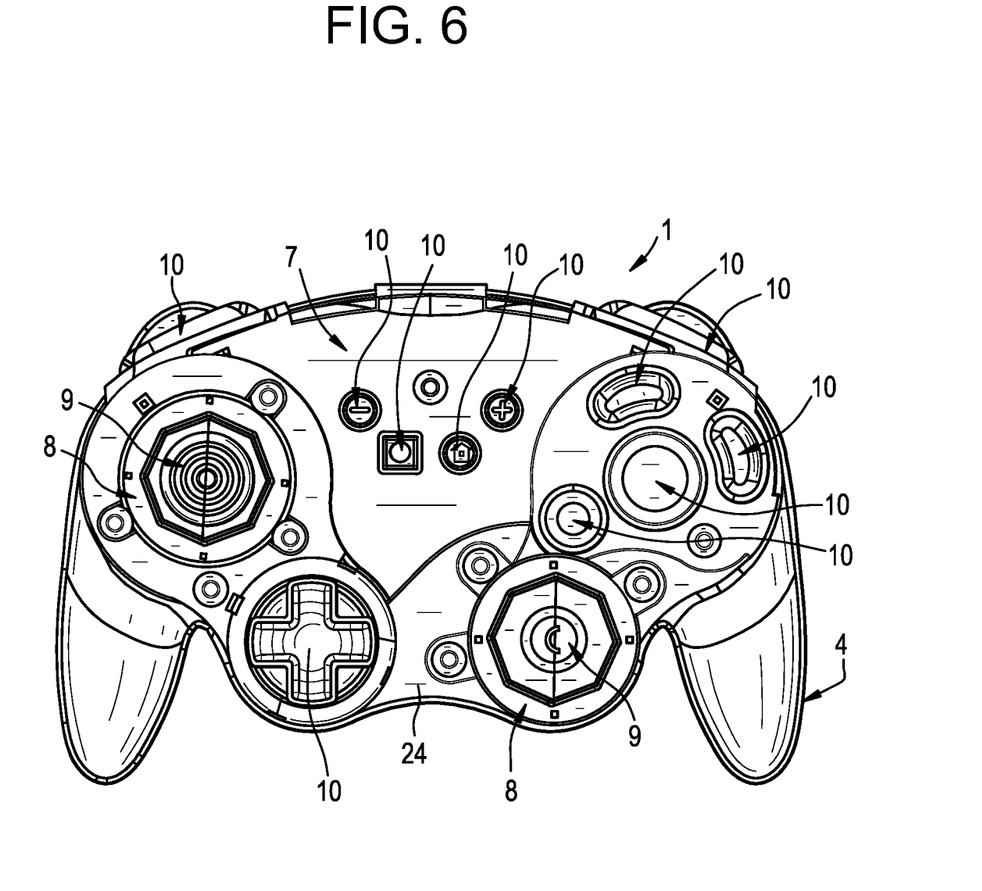
FIG. 6 is a top view of the inner shell of the game controller.

FIG. 5 is a bottom view of the inner shell 1 of the game controller 20. As shown, preferably the bottom of the inner shell 1 includes internal mode switches, buttons and/or knobs 6 for setting the mode related to corresponding controls 9, 10 that are provided on the top of the inner shell (as shown in FIGS. 1 and 6). As shown in FIG. 5, preferably the bottom of the inner shell 1 also includes removable mounting plates 7, removable buttons 10, and preferably an edge of the bottom inner shell provides a stabilizing lip 4.

FIG. 6 is a top view of the inner shell 1. As shown, preferably there are a plurality of removable buttons 10 as well as a removable mounting plate 7, removable analog stick restrictive gates 8, removable analog stick covers 9, and preferably an edge of the top inner shell provides a stabilizing lip 4.

Figure 7:
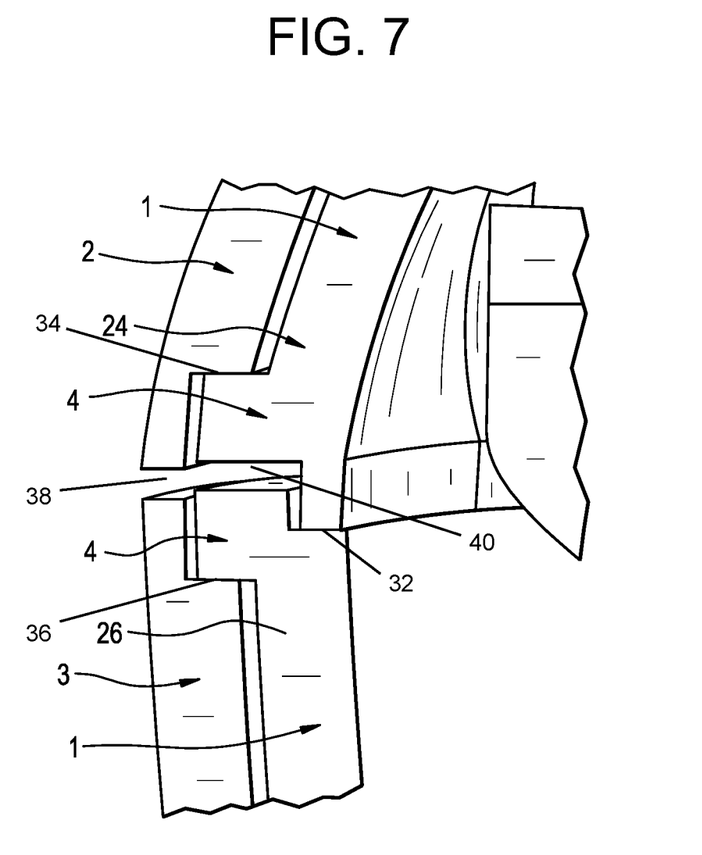
FIG. 7 is a cross-sectional view which shows lip structure that is inside the game controller.

FIG. 7 is a cross-sectional view which shows the lip structure that is inside the game controller 20. As shown, preferably the top and bottom inner shells (24 and 26, respectively) contact each other (at line 32) to provide structural support. Additionally, preferably the outer top shell 2 contacts the stabilizing lip 4 on the top inner shell 24 (at line 34), and the outer bottom shell 3 contacts the stabilizing lip 4 on the bottom inner shell 26 (at line 36), also to provide structural support. In contrast, preferably the two outer shells 2 and 3 are spaced away from each other to provide a gap 38 so that they do not become so tight relative to each other such that it becomes difficult to pull them apart. As shown in FIG. 7, preferably there is also a gap 40 provided between the stabilizing lips 4 of the top and bottom inner shells 24 and 26.

Preferably, as shown in FIGS. 5 and 6, the stabilizing lip 4 goes all the way around the perimeter of both the top and bottom inner shell members 24 and 26. The lip 4 provides the external shells 2 and 3 a support structure to sit on which prevents the external shells 2 and 3 from flexing or wobbling when they are gripped. Effectively, this lip 4 provides stability to the overall multi-shell design 20 shown in FIG. 1.

With regard to how the shells 2, 3, 24, 26 of the game controller 20 all interconnect, preferably this is achieved via magnets. By using magnets, a user can readily disassemble the game controller 20 (without using tools and without risking breaking any snap features) such as to swap out controls 9, 10 or gates 8, or to interact with the switches, buttons and/or knobs 6 (see FIG. 5) that are provided on the bottom of the inner shell 1 of the game controller 20.

Figure 8:
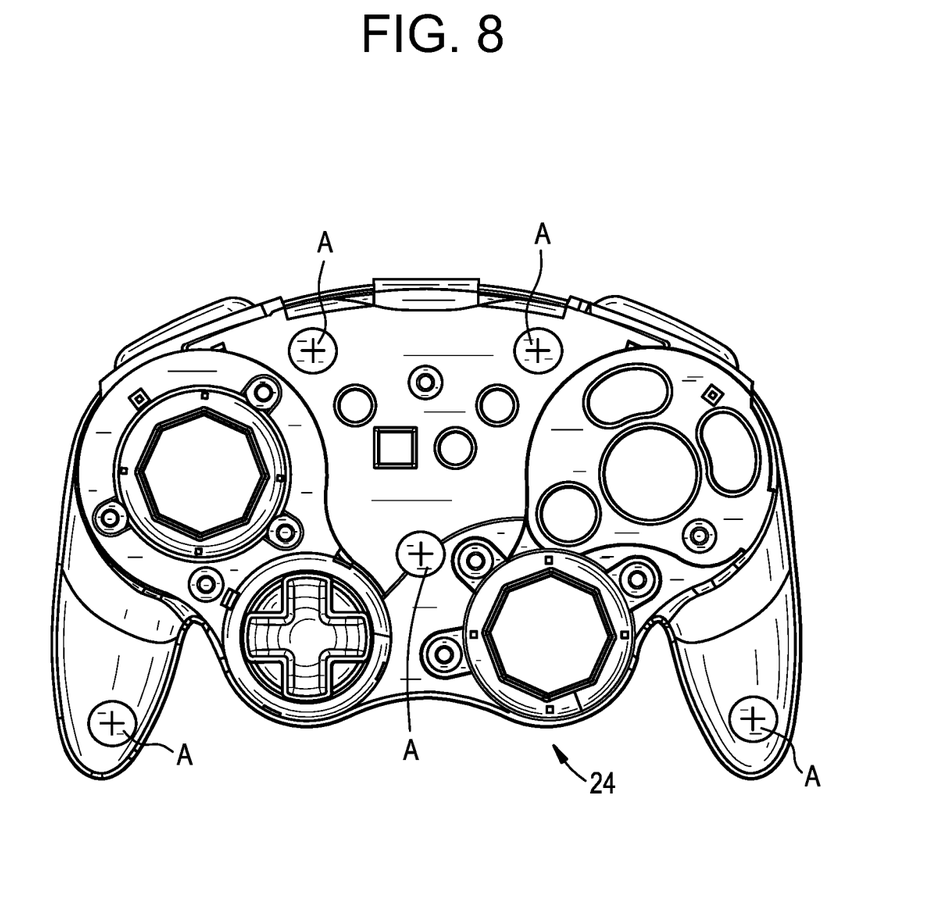
FIG. 8 is a top view of the top, inner shell, showing one possible location of magnets thereon.
Figure 9:
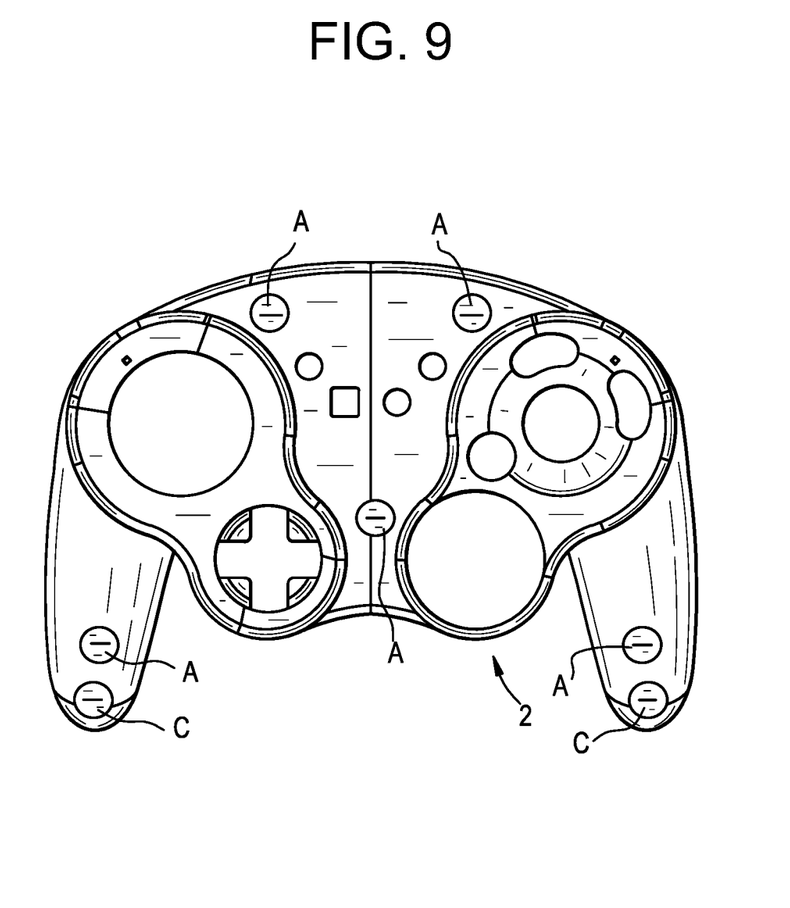
FIG. 9 is a top view of the top, outer shell, showing one possible location of magnets thereon.
Figure 10:
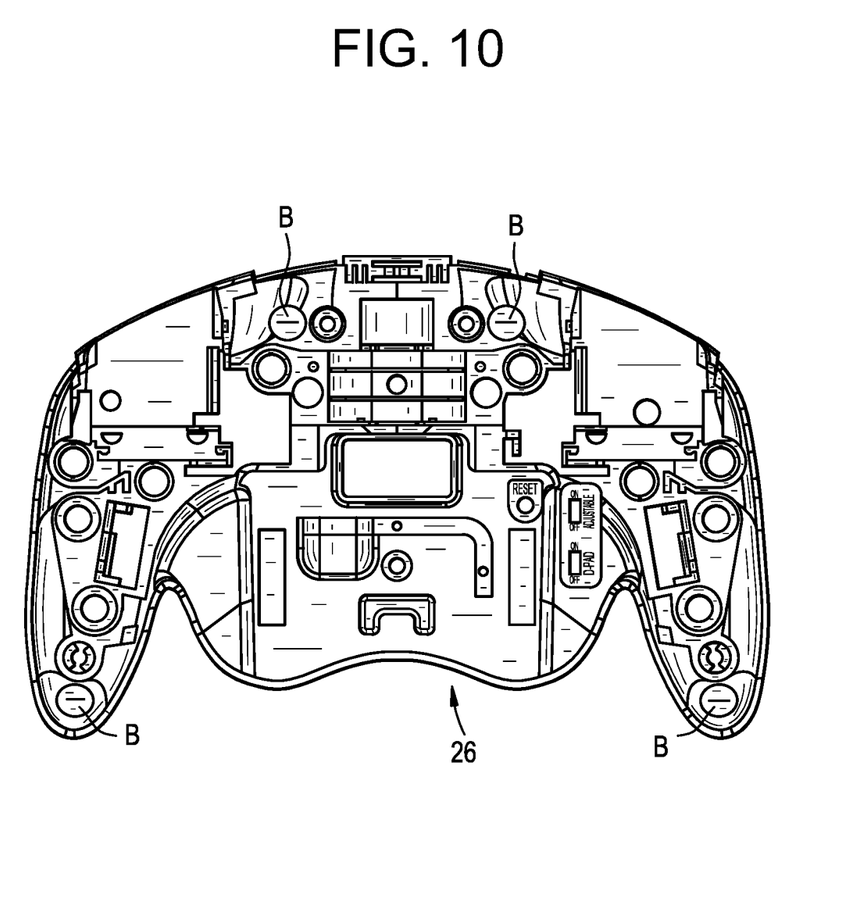
FIG. 10 is a top view of the bottom, inner shell, showing one possible location of magnets thereon.
Figure 11:
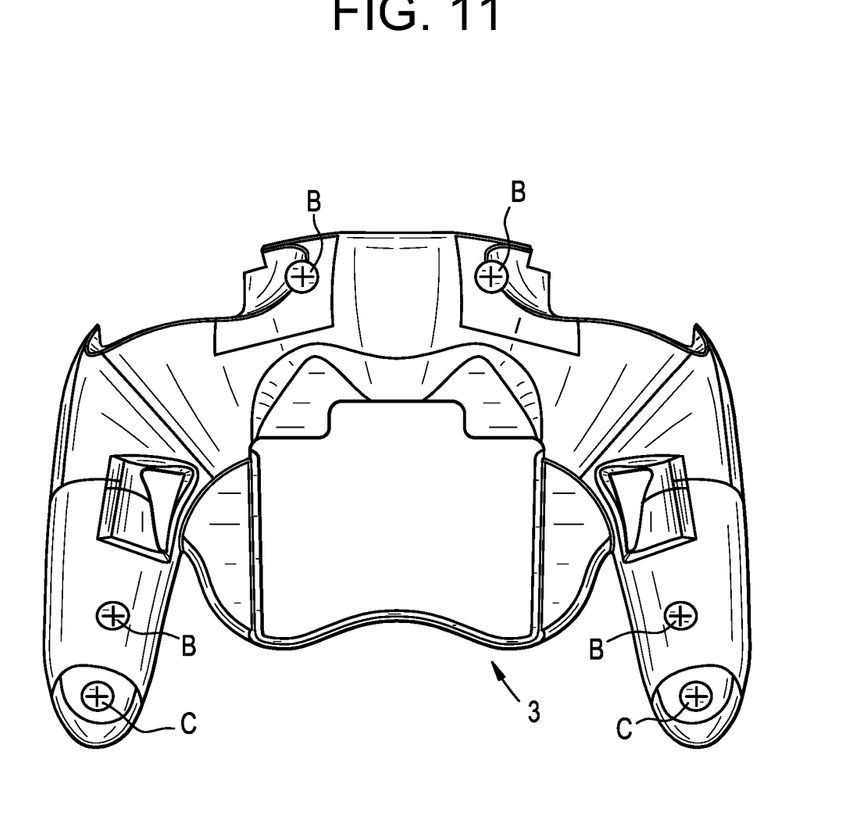
FIG. 11 is a bottom view of the bottom, outer shell, showing one possible location of magnets thereon.

FIG. 8-11 show one possibility of the placement of these magnets, wherein FIG. 8 is a top view of the top, inner shell 24, FIG. 9 is a top view of the top, outer shell 2, FIG. 10 is a top view of the bottom, inner shell 26, and FIG. 11 is a bottom view of the bottom, outer shell 3.

In these Figures, the polarity of each of the magnets is indicated with either a + or a − symbol, wherein obviously opposites attract. As such, magnets A on the top, inner shell 24 (see FIG. 8) effectively mate with corresponding magnets A on the top, outer shell 2 (see FIG. 9). Likewise, magnets B on the bottom, outer shell 3 (see FIG. 11) effectively mate with corresponding magnets B on the bottom, inner shell 26 (see FIG. 10). Magnets C on the bottom, outer shell 3 (see FIG. 11) effectively mate with Magnets C on the top, outer shell 2 (see FIG. 9). Preferably, the inner shell 1 is shaped such that magnets C on the bottom, outer shell 3 (see FIG. 11) can readily mate with corresponding Magnets C on the top, outer shell 2 (see FIG. 9) without either the top, inner shell 24 (see FIG. 8) or the bottom, inner shell 26 (see FIG. 10) interfering with this attraction.

Figure 12:
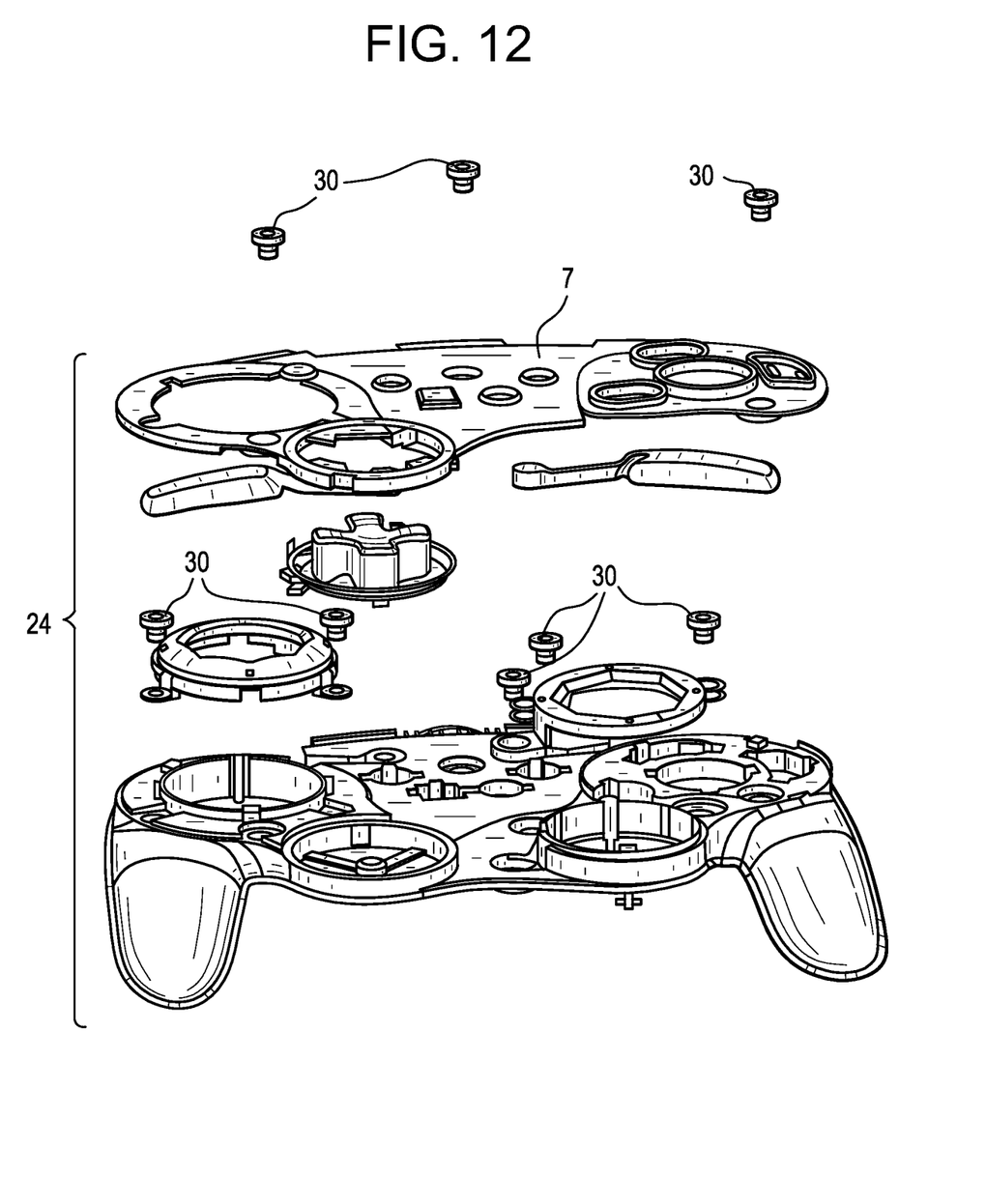
FIG. 12 is an exploded view of the top, inner shell of the game controller.

FIG. 12 is an exploded view of the top, inner shell 24. As shown, a removable mask component 7 is provided, and all the components of the top, inner shell 24 can be swapped out, replaced, etc. merely by removing certain fasteners 30, such as small threaded hex bolts that engage corresponding threaded bores (not specifically shown) provided inside the game controller. The mask component 7 allows for the secure mounting of buttons and triggers (9 and 10, as shown in FIG. 1) to maintain optimum performance while still providing the ability to swap out controls for similar controls with different aesthetics. A similar feature 7 (See FIG. 5) can be provided on the bottom shell 26 for removing trigger buttons 10 and rear buttons.

This as well as the magnetic connection between all the main components allows a user to easily customize the game controller by swapping out components, changing modes of the various controls, etc.

With regard to swapping the external shell of the game controller, the external top and bottom structures 2 and 3 can be removed from the internal controller structure 1 by pulling up on the edges of the external structures 2 and 3 with enough force to overcome the magnetic mounting system holding the external structures 2 and 3 to the internal controller structure 1. The user can then replace the external structures 2 and 3 with a different set of external structures that share the same magnetic mounting system as the original external structures. The new external structures may have different aesthetics or have a different ergonomic shape. The new external structures can then be placed on the internal controller structure 1 so that the magnetic mounting system holds them securely. To do so, the external structures must be properly aligned so they sit on the internal structure stabilizing lip 4, as shown in FIG. 7.

With regard to replacing buttons, when the external structures 2 and 3 are removed from the controller, the user can then access the removable mounting plates 7, which can be removed with, for example, a hex wrench. With the mounting plates 7 removed, the user can then easily pull out the buttons 10 and place new buttons into the controller. To reassemble the controller, the user must secure the original mounting plates 7 again with the screws and hex wrench, and then remount the external structures 2 and 3 as described in the swap external shell section.

With regard to replacing analog stick covers and/or gates 8, the procedure to replace the analog stick covers 9 is the same as the procedure to replace buttons 10, except instead of removing the mounting plates 7, the user must remove the replaceable gates 8. These gates 8 can also be replaced with gates that have a different shape.

With regard to changing controller settings, with the external structures 2 and 3 removed from the controller, the user can then access any number of internal mode switches, buttons and knobs 6 (see FIG. 5). The user can interact with those features to change how the controller functions, and then remount the external structures 2 and 3 as described in the swap external shell section.

All of the parts which can be removed from the controller, can be replaced with parts that have different aesthetics than the original.

Removing the external structures can provide access to any number of replaceable, modifiable, and/or customizable components including but not limited to: analog stick restricting gates, buttons, analog stick caps, triggers, electrical components, etc.

Removing the external structures can provide access to any number of feature mode changes which can be implemented through switches, buttons, knobs, or any other means of electrical component actuation. The feature mode changes can include but are not limited to, turning on and off rumble motors, turning on and off individual button functionality, calibrating analog inputs, returning the controller to factory default settings, adjusting analog input functionalities, adjusting digital input functionalities, etc.

In other words, not only can the external top and bottom structures be swapped out with structures that have a differently shape (ergonomics) or different appearance (aesthetics: color, artwork, etc.), but removing the external structures provides access to the internal structure, which can be modified or replaced, without negatively effecting the performance of the controller, or external aesthetics.

The embodiment of the present invention described hereinabove not only enables the user to make changes to their own controller's ergonomics and aesthetics, but the magnetic connection makes it simple to do so without requiring a full disassembly of the gaming controller or risking damage to the controller. The embodiment also allows for the full shape of the external shell to be changed, not simply made thicker, while retaining the feel/texture of the original material. The ability to customize the shape of the controller by swapping out the external structure allows for the user to change the controller that has the functionality they prefer to also have the most comfortable form factor for the individual user. This can lead to a more enjoyable gaming experience and lowers the risk of repetitive strain injury from using a controller that can cause pain when being used for extended periods of time because of ergonomic incompatibility with the user.

With regard to modularity, with the external top and bottom structures of the controller removed, the user is provided easy access to make changes or replacements to the inner components of the controller. The top and bottom structures and then be replaced without any effect to the functionality of the controller. This enables customization of analog stick, buttons, analog stick restricting gates, electrical components, etc. Furthermore, this provides access to any number of performance mode changing input devices (switches, knobs, buttons, etc.) that can be used to fine tune the performance of the controller to the users' preference. Having these input devices only accessible after removing the external structures, ensures the user cannot accidentally trigger them while playing, and allows for more freedom in the ergonomic design of the external structures.

Using magnets to mate the external shells to the internal structure allows for the simplest method of swapping out external shells. Using any fastener requires the use of a tool. Another tool-less method is using snap-fits. However, snap-fits wear down the more that they are used. Additionally, the act of removing the outer shells that are held together with snap-fits can be cumbersome, often requiring a tool to pry the snaps apart which can then damage the outer shells. Using magnets simplifies removing the external shells by not requiring any mechanical unsnapping. Additionally, if both the internal and external shells have magnets of opposite polarity, those magnets exerting their magnetic force on each other, will keep the magnetic strength of the magnets from degrading over time, providing greater longevity than snap-fits.

Using magnets to mate the external shells to the internal structure, in addition to the mating lip and guides, provides greater stability than just using guides to connect the internal structure and the external structure. If only the external shells snap fit together, the only mating features between the external and internal shells would be guides and slots for those guides to go into. While the guides would help to create proper alignment, they will still allow for some shift from side to side in their slots, and definitely allow for vertical shifting. As the snaps holding the external shells wear down (or if the plastic shells are warped at all), the internal shell may be able to move within the external shells. The outer and inner shells need to have constant force holding them together so they act as one part when they are connected. The embodiment disclosed herein uses magnets to connect the external shells to the internal shells, as well as the external shells to each other. A direct force holding the external and internal shells together is more secure than an indirect force that can wear down over time.

Overall, the concept and method disclosed herein of having removable exterior shells (for the purpose of customizing aesthetics and ergonomics) is user friendly in how the shells are removed, structurally secure when the exterior shells are mounted to the internal shells, provides a structurally sound method with a long lifespan for mounting the external shells to the internal shells over time, allowing for many total swaps, and provides good customization possibilities in allowing for buttons, triggers, sticks, and other actuators to be swapped out while maintaining secure strong connections when mounted.

While a specific embodiment of the invention has been shown and described, it is envisioned that those skilled in the art may devise various modifications without departing from the spirit and scope of the present invention.

What is claimed is:

1. A game controller comprising:
   at least one control configured for user-interaction;
   an outer shell configured to be gripped;
   magnets inside the game controller, wherein the magnets hold the outer shell together; and,
   an internal core structure, wherein the outer shell comprises a top shell and a bottom shell, wherein the internal core structure comprises an inner shell, said inner shell comprising a top inner shell and a bottom inner shell, said top inner shell comprising an edge, wherein the edge of the top inner shell provides a stabilizing lip, said bottom inner shell comprising an edge, wherein the edge of the bottom inner shell provides a stabilizing lip, wherein the stabilizing lip on the top inner shell is spaced away from the stabilizing lip on the bottom inner shell, wherein the top inner shell contacts the bottom inner shell to provide structural support, and wherein the top shell and the bottom shell are spaced away from each other.

2. A game controller as recited in claim 1, wherein the at least one control comprises an analog joystick, wherein the game controller further comprises at least one removable gate proximate said analog joystick.

3. A game controller as recited in claim 1, wherein the outer shell covers and protects the internal core structure.

4. A game controller as recited in claim 3, wherein the internal core structure comprises a perimeter and the stabilizing lip goes along the perimeter.

5. A game controller as recited in claim 3, wherein the bottom of the inner shell comprises internal mode switches, buttons and/or knobs for setting a mode related to corresponding controls that are provided on the top of the inner shell.

6. A game controller as recited in claim 3, wherein the bottom of the inner shell comprises removable mounting plates and removable buttons.

7. A game controller as recited in claim 1, wherein both the top shell and the bottom shell comprise user interface feature holes configured to receive controls of the game controller such that the controls extend through the user interface feature holes to allow access.

8. A game controller as recited in claim 1, further comprising a plurality of removable buttons, a removable mounting plate, removable analog stick restrictive gates, and removable analog stick covers.

9. A game controller as recited in claim 1, wherein magnets on the top inner shell mate with corresponding magnets on the top shell, wherein magnets on the bottom shell mate with corresponding magnets on the bottom inner shell, wherein magnets on the bottom shell mate with magnets on the top shell, wherein the inner shell is shaped such that magnets on the bottom shell mate with corresponding magnets on the top shell without the inner shell interfering.

10. A game controller as recited in claim 1, wherein the outer shell covers and protects the internal core structure, further comprising a removable mask component, wherein all components of the top of the inner shell are swappable by removing fasteners provided inside the game controller, wherein the removable mask component allows for the secure mounting of buttons and triggers while providing an ability to swap out controls for similar controls with different aesthetics.

11. A game controller comprising:
at least one control configured for user-interaction;
an outer shell configured to be gripped, having a top shell and a bottom shell;
magnets inside the game controller, wherein the magnets hold the outer shell together; and,
an internal core structure, wherein the outer shell surrounds the internal core structure, wherein the internal core structure comprises an inner shell, said inner shell comprising a top inner shell and a bottom inner shell, wherein magnets on the top inner shell mate with corresponding magnets on the top shell, wherein magnets on the bottom shell mate with corresponding magnets on the bottom inner shell, wherein magnets on the bottom shell mate with magnets on the top shell, wherein the inner shell is shaped such that magnets on the bottom shell mate with corresponding magnets on the top shell without the inner shell interfering.

12. A game controller as recited in claim 11, wherein the at least one control comprises an analog joystick, wherein the game controller further comprises at least one removable gate proximate said analog joystick.

13. A game controller as recited in claim 11, wherein the outer shell covers and protects the internal core structure.

14. A game controller as recited in claim 11, wherein the internal core structure comprises a perimeter and a stabilizing lip which goes along the perimeter.

15. A game controller as recited in claim 11, wherein both the top shell and the bottom shell comprise user interface feature holes configured to receive controls of the game controller such that the controls extend through the user interface feature holes to allow access.

16. A game controller as recited in claim 11, wherein the bottom of the inner shell comprises internal mode switches, buttons and/or knobs for setting a mode related to corresponding controls that are provided on the top of the inner shell.

17. A game controller as recited in claim 11, wherein the bottom of the inner shell comprises removable mounting plates and removable buttons.

18. A game controller as recited in claim 11, wherein each of said top inner shell and bottom inner shell comprising an edge, wherein the edge of each of the top inner shell and bottom inner shell provides a stabilizing lip.

19. A game controller as recited in claim 18, wherein the stabilizing lip of the top inner shell is spaced away from the stabilizing lip of the bottom inner shell.

20. A game controller as recited in claim 11, further comprising a plurality of removable buttons, a removable mounting plate, removable analog stick restrictive gates, and removable analog stick covers.

21. A game controller as recited in claim 11, wherein the top inner shell contacts the bottom inner shell to provide structural support.

22. A game controller as recited in claim 11 further comprising a removable mask component, wherein all components of the top of the inner shell are swappable by removing fasteners provided inside the game controller, wherein the removable mask component allows for the secure mounting of buttons and triggers while providing an ability to swap out controls for similar controls with different aesthetics.

* * * * *